Dec. 10, 1940.                A. CONIGLIO                 2,224,378
                              COFFEE FILTER
                           Filed April 6, 1939
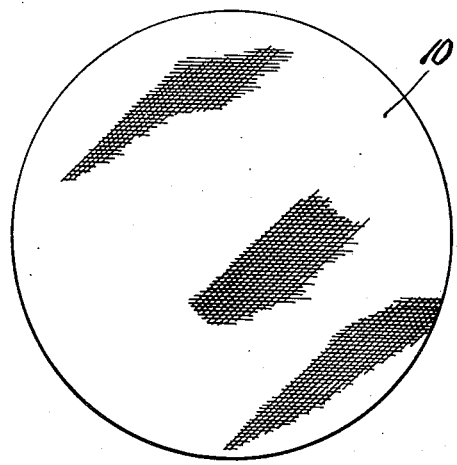
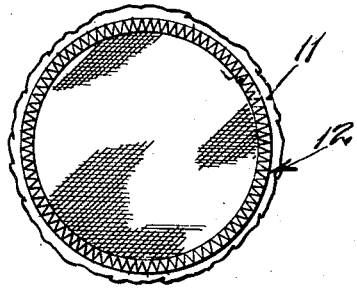
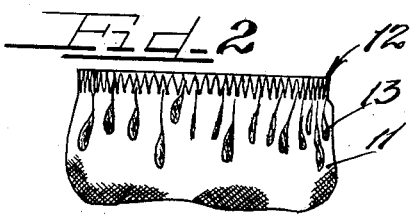
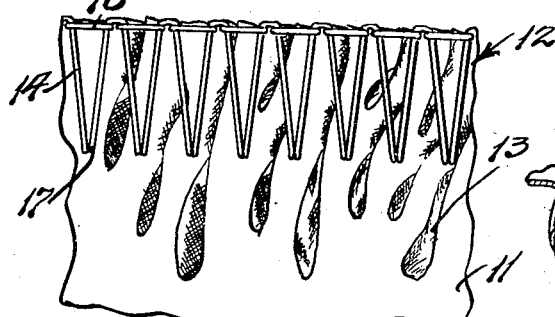
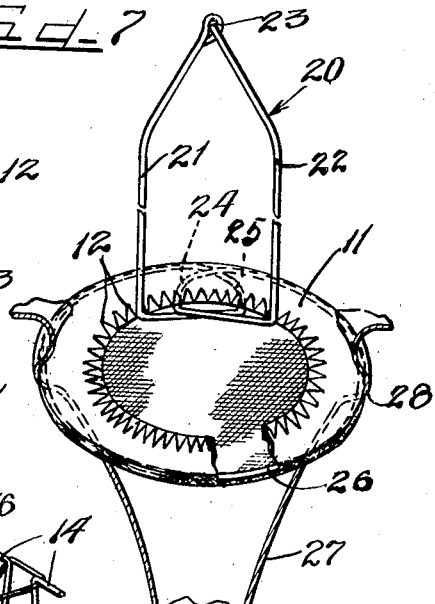
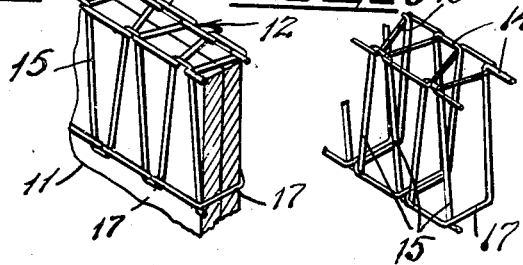
Inventor
Anthony Coniglio.

Patented Dec. 10, 1940

2,224,378

UNITED STATES PATENT OFFICE 2,224,378

COFFEE FILTER

Anthony Coniglio, Chicago, Ill.

Application April 6, 1939, Serial No. 266,300

2 Claims. (Cl. 210—162)

This invention relates to filters or strainers for use in beverage brewing devices and the like, and more particularly to a cup-shaped filter especially adapted for use in coffee brewing.

An object of this invention is to provide a cup-shaped filter of the foregoing type made of cloth material and which is held in its desired shape without requiring the use of any separate strings such as are now commonly used with such filters.

Another object of this invention is to provide a cup-shaped filter which is formed from a disk of cloth material, and which is held in the desired cup shape solely by reason of the contemporaneous puckering and stitching of the peripheral edge of the material, and which stitching provides the edge with sufficient elasticity to enable it to be stretched over a device for holding the filter when it is installed in a beverage brewer such as a so-called vacuum coffee maker.

In accordance with the general features of this invention, there is provided a cupped coffee filter adapted for use in beverage brewing devices and the like and comprising a disk of cloth material having its peripheral edge puckered and stitched by stitching extending over the edge and along both sides of the material adjacent the edge; said disk being cupped and held in a cup shape solely by reason of the stitching and puckering of its edge.

In accordance with other features of the invention, the stitching is applied to the edge of the above noted disk of cloth so as to extend transversely through the material adjacent the edge, and so that the edge is encompassed by a multiple of closely arranged loops of thread which loops comprise three threads—one looped along one side of the edge and through the material, a second being looped along the opposite side of the edge, and a third being looped over the outermost periphery of the edge and tying the loops of the other threads together.

In accordance with still other features of my invention, I have provided a novel cup-shaped filter having a relatively elastic edge defining the opening of the filter and through which opening is inserted a spring device comprising a looped portion resiliently expanded outward so that the material of the cup is expanded outward inside of the stitched edge of the cup, whereby the cup is flattened into a cap-like shape and is held on the spring device without requiring the use of any draw strings or the like.

Other objects and features of this invention will more fully appear from the following detailed description taken in connection with the accompanying drawing, which illustrates a single embodiment thereof, and in which:

Figure 1 is a plan view of a disk of cloth from which my novel cup-shaped filter is made;

Figure 2 is a side view of the filter after it is formed from the disk of cloth shown in Figure 1;

Figure 3 is a fragmentary plan view of the cup-shaped filter shown in Figure 2;

Figure 4 is a fragmentary enlarged view of a portion of the cup-shaped filter shown in Figure 2 looking at the stitching from the outer side of the stitched edge;

Figure 5 is a fragmentary sectional view taken through a portion of the filter shown in Figure 2 and looking at the stitching from the inside of the cupped filter;

Figure 6 is a diagrammatic view illustrating the arrangement of the three threads which go to make up the stitching encompassing the edge of the cup; and Figure 7 is a fragmentary view partly in section illustrating how a spring expanding device is applied to my novel cup-shaped filter to expand the cup into a cap-like shape for use in a beverage brewing device which is fragmentarily shown.

As shown on the drawing:

The reference character 10 designates generally a disk of cloth from which my novel cup-shaped filter for use in the brewing of coffee and the like is made. This disk of cloth may be made of any desired number of plies, but, as is illustrated in Figure 5, is shown as consisting of two layers or plies.

This disk of cloth is inserted in a suitable sewing or stitching machine, and the peripheral marginal portion of the disk is stitched and puckered so as to form the disk into a cup shape solely by reason of the puckering and stitching operations. In Figure 2, I have illustrated the cup-shaped article or filter which is formed from this disk of cloth, and have designated this filter generally by the reference character 11.

The stitching applied to the outermost portion of the disk of material is designated generally by the reference character 12, and the gatherings or puckerings adjacent the edge of the article are designated by the reference character 13.

In Figures 4, 5, and 6, I have illustrated more in detail, and on an enlarged scale, the formation of the stitching 12 which holds the edge puckered, and which provides the edge with sufficient elasticity so that an expanding device may be inserted through the opening of the cup, such as the device designated generally by the reference 20 in Figure 7, whereby the cup may be held in expanded position in a coffee brewing device designated generally by the reference character 27 in Figure 7.

In making these cup-shaped filters, I have obtained excellent results by applying a stitching consisting of a multiple of closely arranged loops of thread which I have illustrated in Figures 4, 5, and 6 as being three in number.

These threads are designated by the reference numerals 14, 15, and 16. The looped portions of the thread 14 are disposed on the outer side of the edge of the cup. The looped portions of the thread 15 are disposed on the inner side of the cup edge, and the looped portions of the thread 16 are disposed over the outermost periphery of the edge. These latter looped portions of the thread 16, as shown in Figure 6, in reality tie together the looped portions of the two threads 14 and 15, so that the edge of the cloth disk is encompassed by a multiple of inter-tied and connected closely arranged loop portions of thread. It will also be perceived that the thread 14 includes transverse portions 17 which extend and are sewn through the material in back and forth manner as illustrated in Figures 5 and 6.

At the same time that the edge of the article is stitched, the material is puckered or gathered, and the stitching serves to hold the material in this puckered or gathered condition, as a consequence of which the cloth disk is formed into the cup-shaped article shown in Figure 2.

This stitching 12, which is applied to the edge of the article, is of such character that by reason of it and the gathered or puckered portion 13 the edge of the cup-shaped filter is provided with a degree of resiliency which enables the marginal portion of the filter to be expanded and contracted in use, as well as to be held on the spring device for applying it to the beverage brewer without requiring the use of any draw strings such as are now commonly employed.

As noted before, I have illustrated fragmentarily in Figure 7 the manner in which the cup-shaped filter cooperates with the spring retaining and expanding device 20. This device comprises a single length of spring wire having two upstanding legs 21 and 22, which are connected at their extremities by a suitable loop connection 23. The lower portions of these legs 21 and 22 are looped in opposite directions as indicated at 24 and 25 so as to form a spring ring 26, which is adapted to be disposed inside of the cup-shaped filter 11. In the application of this device to the filter, the legs 21 and 22 are pressed toward each other so as to reduce or contract the ring 26, whereby it may be inserted through the opening of the cup-shaped filter and thereafter expanded outwardly behind or underneath the stitched and puckered peripheral portion of the filter. This expanding of the filter results in its being stretched outwardly into a cap-like shape, as shown in Figure 7, whereby it is snugly held on the seat 28 of the coffee brewing device designated generally by the reference numeral 27, and which may be of the type used in the so-called vacuum type coffee brewer.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. As an article of manufacture, a cupped cloth filter for use in coffee brewing and the like comprising a disk of cloth material having its peripheral edge puckered and stitched by stitching extending over the edge and along both sides of the material adjacent said edge, said filter being formed and held cupped solely by said stitching whereby said edge may be expanded and contracted in use without requiring the use of any drawstring or elastic, and said stitching also extending transversely through the material adjacent said edge so that said edge is encompassed by a multiple of closely arranged loops of thread, certain of said loops extending over the edge and others through the wall of the material adjacent the edge and through side portions of the loops over the edge of the material.

2. As an article of manufacture, a cupped cloth filter for use in coffee brewing and the like comprising a disk of cloth material having its peripheral edge puckered and stitched by stitching extending over the edge and along both sides of the material adjacent said edge, said filter being formed and held cupped solely by said stitching, and said stitching also extending transversely through the material adjacent said edge so that said edge is encompassed by a multiple of closely arranged loops of thread, said loops comprising three threads one being looped along one side of the edge and through the material, a second being looped along the opposite side of the edge, and a third being looped over the outermost periphery of the edge and tying the loops of the other threads together.

ANTHONY CONIGLIO.